(12) United States Patent
Prakash et al.

(10) Patent No.: US 9,369,867 B2
(45) Date of Patent: Jun. 14, 2016

(54) MOBILE PLATFORM SOFTWARE UPDATE WITH SECURE AUTHENTICATION

(75) Inventors: Gyan Prakash, Beaverton, OR (US); Jiphun C. Satapathy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 13/539,088

(22) Filed: Jun. 29, 2012

(65) Prior Publication Data

US 2014/0004825 A1    Jan. 2, 2014

(51) Int. Cl.
*H04W 12/06* (2009.01)
*G06F 9/445* (2006.01)
*H04W 12/08* (2009.01)
*H04L 29/08* (2006.01)
*G06F 21/57* (2013.01)
*G06F 21/74* (2013.01)

(52) U.S. Cl.
CPC .............. *H04W 12/06* (2013.01); *G06F 21/57* (2013.01); *G06F 21/572* (2013.01); *G06F 21/74* (2013.01); *H04L 67/34* (2013.01); *H04W 12/08* (2013.01); *G06F 8/65* (2013.01)

(58) Field of Classification Search
None
See application file for complete search history.

(56) References Cited

U.S. PATENT DOCUMENTS

| 7,325,246 | B1 * | 1/2008 | Halasz | H04W 12/06 379/88.17 |
| 8,612,773 | B2 * | 12/2013 | Nataraj et al. | 713/192 |
| 8,793,758 | B2 * | 7/2014 | Raleigh | G06F 21/57 455/414.1 |
| 2003/0174684 | A1 * | 9/2003 | Pohjanvuori | H04W 12/06 370/338 |
| 2004/0003389 | A1 * | 1/2004 | Reynar | G06F 8/65 717/178 |
| 2004/0157584 | A1 * | 8/2004 | Bensimon | H04W 12/06 455/411 |
| 2005/0021968 | A1 * | 1/2005 | Zimmer et al. | 713/176 |
| 2005/0039178 | A1 * | 2/2005 | Marolia et al. | 717/168 |
| 2006/0143600 | A1 | 6/2006 | Cottrell et al. | |
| 2007/0130472 | A1 * | 6/2007 | Buer et al. | 713/182 |
| 2007/0143629 | A1 * | 6/2007 | Hardjono et al. | 713/189 |
| 2008/0244553 | A1 * | 10/2008 | Cromer et al. | 717/168 |
| 2008/0276301 | A1 * | 11/2008 | Nataraj et al. | 726/3 |

(Continued)

OTHER PUBLICATIONS

Dai et al., "TEE: a virtual DRTM based execution environment for secure cloud-end computing," 2010, Proceedings of the 17th ACM conference on Computer and communications security, pp. 663-665.*

(Continued)

*Primary Examiner* — Xi D Chen
*Assistant Examiner* — Stephen Berman
(74) *Attorney, Agent, or Firm* — Grossman, Tucker, Perreault & Pfleger, PLLC (57) ABSTRACT

Generally, this disclosure describes devices, methods and systems and for securely updating software on a mobile platform using trusted hardware based authentication. The device may include an image update module configured to receive a software update image from an update server, the image update module executing at an operating system (OS) level; a critical component database configured to identify critical software components associated with the secure operation of the device; a secure update application module configured to verify the inclusion of the critical software components in the software update image prior to installation of the software update image on the device; and a trusted execution environment (TEE) configured to restrict control access and data access to the secure update application module and the critical component database, the restriction enforced against the OS and against modules executing at the OS level.

29 Claims, 6 Drawing Sheets

(56) References Cited

U.S. PATENT DOCUMENTS

| | | | |
|---|---|---|---|
| 2008/0307230 A1* | 12/2008 | Kawamae | 713/176 |
| 2009/0282399 A1* | 11/2009 | Kamrowski | 717/174 |
| 2010/0011350 A1* | 1/2010 | Zayas | G06F 8/65 |
| | | | 717/171 |
| 2011/0131403 A1 | 6/2011 | Ibrahim et al. | |
| 2011/0321024 A1* | 12/2011 | Knothe et al. | 717/168 |
| 2012/0054734 A1* | 3/2012 | Andrews | G06F 8/65 |
| | | | 717/171 |
| 2012/0072734 A1* | 3/2012 | Wishman et al. | 713/189 |
| 2012/0096450 A1 | 4/2012 | Schaefer et al. | |
| 2012/0174095 A1* | 7/2012 | Natchadalingam et al. | 718/1 |
| 2012/0297200 A1* | 11/2012 | Thom | G06F 21/57 |
| | | | 713/189 |
| 2013/0074061 A1* | 3/2013 | Averbuch et al. | 717/171 |
| 2015/0079933 A1* | 3/2015 | Smith | H04W 4/02 |
| | | | 455/411 |

OTHER PUBLICATIONS

Bugiel et al., "Implementing an application-specific credential platform using late-launched mobile trusted module," 2010, Proceedings of the fifth ACM workshop on Scalable trusted computing, pp. 21-30.*

Kostiainen et al., "On-board credentials with open provisioning," 2009, Proceedings of the 4th International Symposium on Information, Computer, and Communications Security, pp. 104-115.*

International Search Report and Written Opinion received for PCT Patent Application No. PCT/US2013/047413 , mailed on Oct. 7, 2013.

International Preliminary Report on Patentability received for PCT Patent Application No. PCT/US2013/047413 , mailed on Jan. 8, 2015.

European Search Report received for European Patent Application No. 138089172, mailed Dec. 8, 2015, 10 pages.

IEEE Standard 802.16.2, Coexistence of Fixed Broadband Wireless Access System, Mar. 17, 2004, 171 pages.

IEEE Amendment 5: Bridging of Standard 802.16K, IEEE Standard for Local and Metropolitan Area Networks: Median Access Control (MAC) Bridges, Aug. 14, 2007, 14 pages.

IEEE Standard 802.16m, Amendment 3: Advanced Air Interface, Part 16: Air Interface for Broadband Wireless Access Systems, May 6, 2011, 1006 pages.

IEEE Standard for Information Technology 802.11, IEEE Computer Society, Jun. 12, 2007, 1232 pages.

Office Action received for Korea Application No. 2014-7033156, mailed on Jan. 20, 2016, 7 pages of English Translation and 9 pages of Korea Office Action.

* cited by examiner

MOBILE PLATFORM SOFTWARE UPDATE WITH SECURE AUTHENTICATION

FIELD

The present disclosure relates to secure operating system and firmware updates for mobile platforms, and more particularly, to secure operating system and firmware updates for mobile platforms with trusted hardware based authentication.

BACKGROUND

Mobile devices and platforms, such as, for example, smartphones, typically provide the capability for operating system (OS) and firmware (FW) updates or re-installations with reduced user involvement. The user involvement may often be limited to clicking an icon or accepting an agreement. While this reduced level of involvement may provide convenience and an improved user experience, it fails to address the issue of secure user authentication. A stolen phone, for example, can be re-flashed with a new OS or FW image allowing the unauthorized user to bypass the OS login screen or other methods of user authentication.

An additional problem with automatic wireless (or Over-The-Air) software updates, is the lack of a mechanism by which the user, or a remote authorized administrator, can verify that the new OS/FW image includes all the required software components necessary to meet the needs of the enterprise and that the update did not roll back any previously made changes.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for securely updating software, including operating system (OS) and/or firmware (FW), on a mobile platform or device using trusted hardware based authentication. A trusted execution environment (TEE) on the device hosts a database of critical software components and a secure update application module. The TEE may restrict control access and data access to both the database and the secure update application module from entities outside of the TEE, including the OS and other modules executing at the OS level. The critical software components identified in the database may be those components that are recognized as necessary for the secure operation of the device, and the secure update application module may ensure that software update images include all of these components before allowing installation of the update. The secure update application module may also maintain user authentication information used to verify the identity and/or authority of the user to install the update.

The system may also provide the capability for a local user, or a remote administrator, to query the device regarding the identity of the software components included in the update image and to verify that the device is properly configured.

The term access point (AP) as used herein, is defined as any entity that has station (STA) functionality and provides access to the distribution services, via the wireless medium (WM) for associated STAs.

The term Personal basic service set Control Point (PCP) as used herein, is defined as a STA that operates as a control point of the millimeter-wave (mm-wave) network.

The term wireless network controller as used herein, is defined as a station that operates as a PCP and/or as an AP of the wireless network.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a smartphone, a digital television, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A), and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Figure 1:
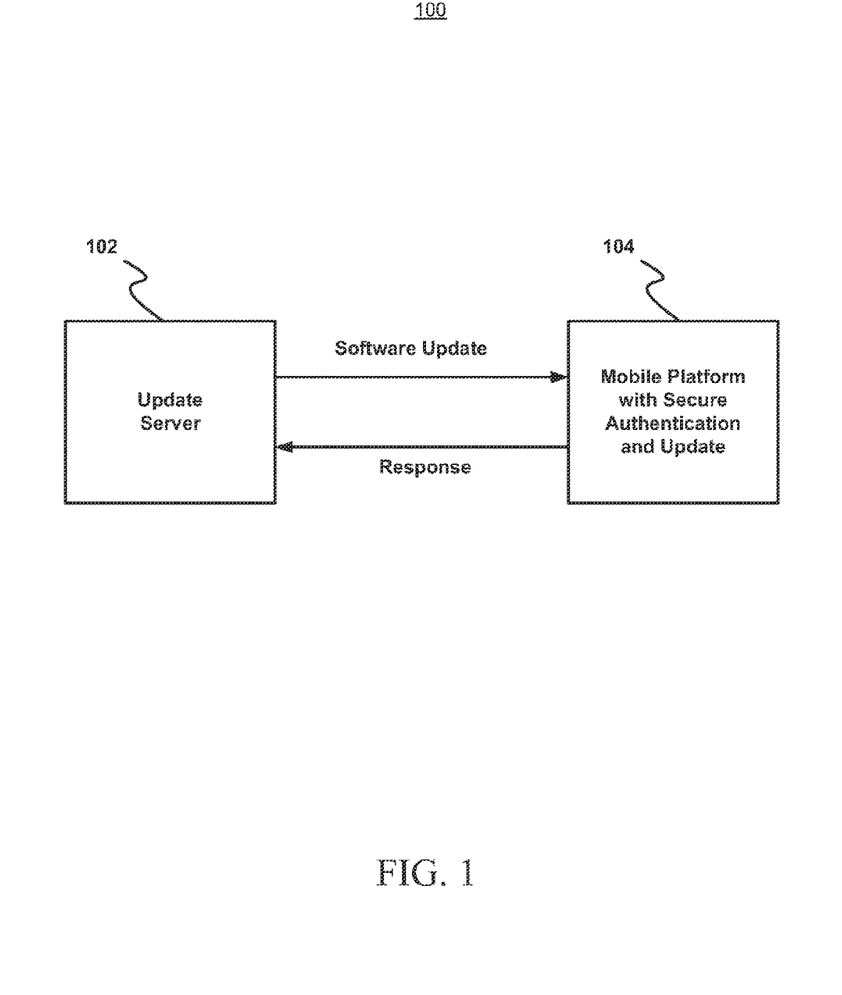
FIG. 1 illustrates a top level system diagram of one exemplary embodiment consistent with the present disclosure.

FIG. 1 illustrates a top level system diagram 100 of one exemplary embodiment consistent with the present disclosure. An update server 102, which may be a trusted or secure server, may provide software updates to a mobile platform 104 with secure authentication and update capability as will be described in more detail below. Mobile platform 104 may be any type of mobile or wireless communication device, such as, for example, a smartphone, a laptop or a tablet. The software updates may be provided wirelessly to any number of mobile platforms 104. In some embodiments the updates may be provided as a response to a request from the platform 104 or as a "push" from the server 102, i.e., the server schedules or initiates the update transmission. The platform 104 may send a response to the server 102. The response may verify that the update was successful or it may indicate a problem. Problems may include, for example, that critical software components were missing from the update image or that a user identity could not be verified.

Figure 2:
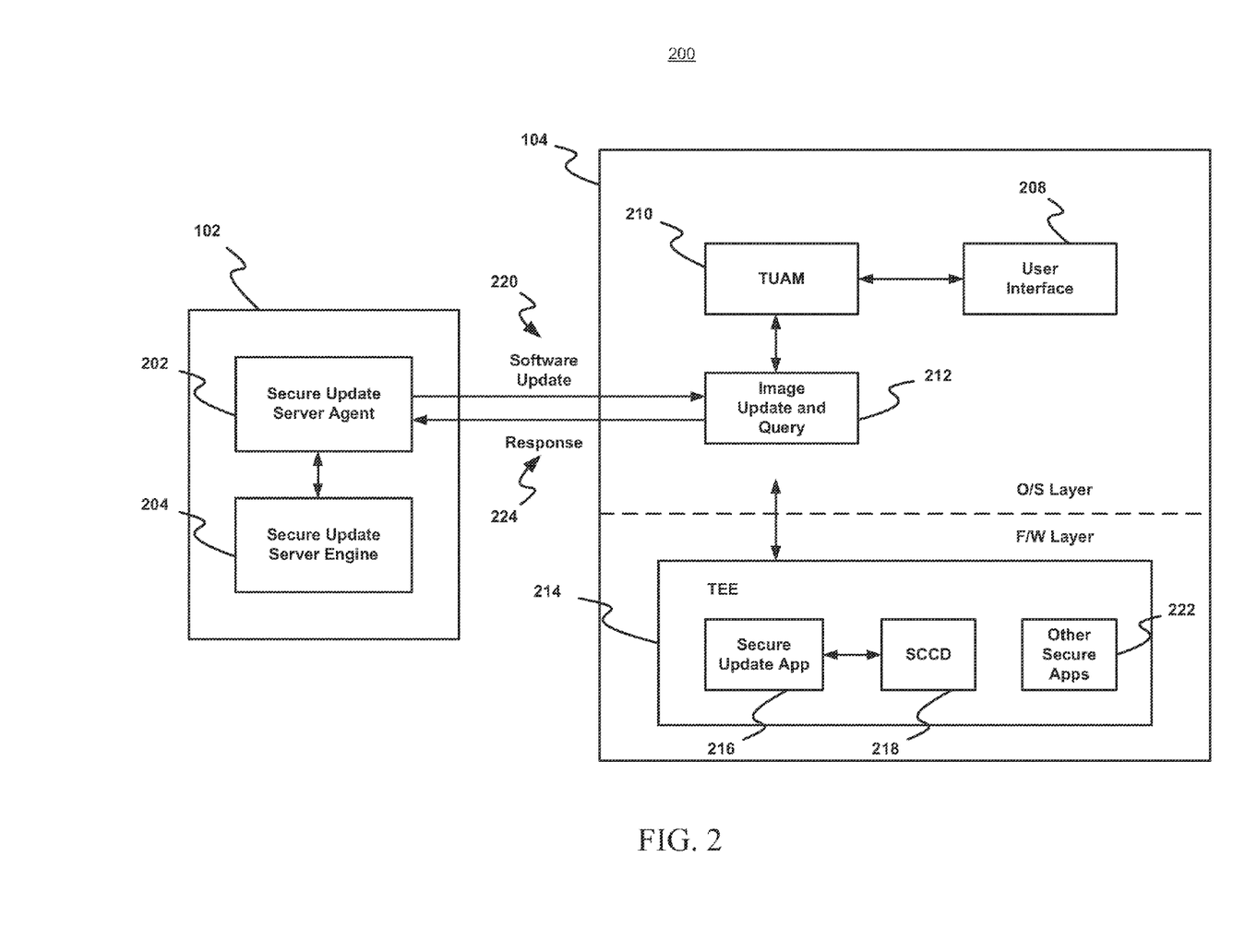
FIG. 2 illustrates a block diagram of one exemplary embodiment consistent with the present disclosure.

FIG. 2 illustrates a block diagram 200 of one exemplary embodiment consistent with the present disclosure. Update server 102 and mobile platform 104 are shown in greater detail. Mobile platform 104 is shown to include a trusted user authentication module (TUAM) 210, an image update and query module 212, a user interface 208, a trusted execution environment (TEE) 214, a secure update application module 216 and a software critical component database (SCCD) 218.

The TEE 214 provides a secure environment within which the secure update application module 216 and the software critical component database (SCCD) 218 may reside and operate. Other secure application modules 222, unrelated to software updates, may also reside in the TEE. Additionally, the TEE 214 may handle at least portions of encryption, decryption and authentication operations. In some embodiments, the TEE 214 may be considered to reside in a FW layer. The TEE 214 provides security and isolation from other entities that are outside the TEE, such as, for example, the OS and other non-trusted applications operating at the OS level or layer. The OS level may generally be considered to be a less secure and more easily modified level of software in a multi-layer abstraction model of software and generally resides between the lower level (more secure) firmware and the higher level (less secure) user applications. The isolation may prevent external entities from exercising control over the secure processing modules 216, 222 or obtaining access to data stored in the SCCD 212. In some embodiments, the TEE 214 may comprise separate physical hardware, for example an integrated circuit (IC) that is separate from an IC associated with the mobile platform 104. In some embodiments, the TEE 214 may comprise a separate controller or processor within an IC that is shared with the mobile platform 104. In some embodiments, the TEE 214 may comprise a separate domain within a controller or processor that is shared with the mobile platform 104. Various techniques may be employed to securely isolate the TEE 214 including situations where hardware is being shared between the TEE 214 and the mobile platform 104. These techniques may include privileged execution modes associated with a shared processor and access protection mechanisms associated with a shared memory.

The software critical component database (SCCD) 218 may be provided to identify those software components that are recognized as necessary for the secure operation of the device, and the secure update application module 216 may ensure that software update images include all of these components before allowing installation of the update. This may be accomplished by checking information contained in headers associated with the images against information in the SCCD 218 as will be described in greater detail below. The secure update application module may also maintain user authentication information that is employed to verify the identity and/or authority of the user to install the update. The user authentication information may include, for example, passwords or any other suitable type of authenticating information.

The trusted user authentication module (TUAM) 210, which may execute at the OS layer, is provided to authenticate the identity of the user based on authentication information maintained in the TEE 214 by the secure update application module 216 against credentials supplied by the user through user interface 208. User authentication may be required prior to the installation of the software update. In some embodiments, the device may be disabled or allowed to operate for limited durations or with reduced capabilities if user authentication is not performed within a pre-determined time following the software update.

Image update and query module 212, which may also execute at the OS layer, is provided to interface with the update server 102 to receive software update images 220 and provide responses 224. Communication between the mobile platform 104 and the update server 102 may be accomplished wirelessly. The image update and query module 212 may also provide the capability for a local user, or a remote authorized administrator, to query the device regarding the identity of the software components included in the update image and to verify that the device is properly configured.

Update server 102 is shown to include a secure update server agent 202 and a secure update server engine 204. In some embodiments, secure update server engine 204 may include a library of software subroutines or functions that may be made available and employed in the construction of software update images for mobile platforms or devices in general. This library may thus provide advantages associated with standardization. In contrast, secure update server agent 202 may be provided, developed or maintained by $3^{rd}$ party application developers and may be configured to produce software update images that are configured for specific mobile platforms.

Figure 3:
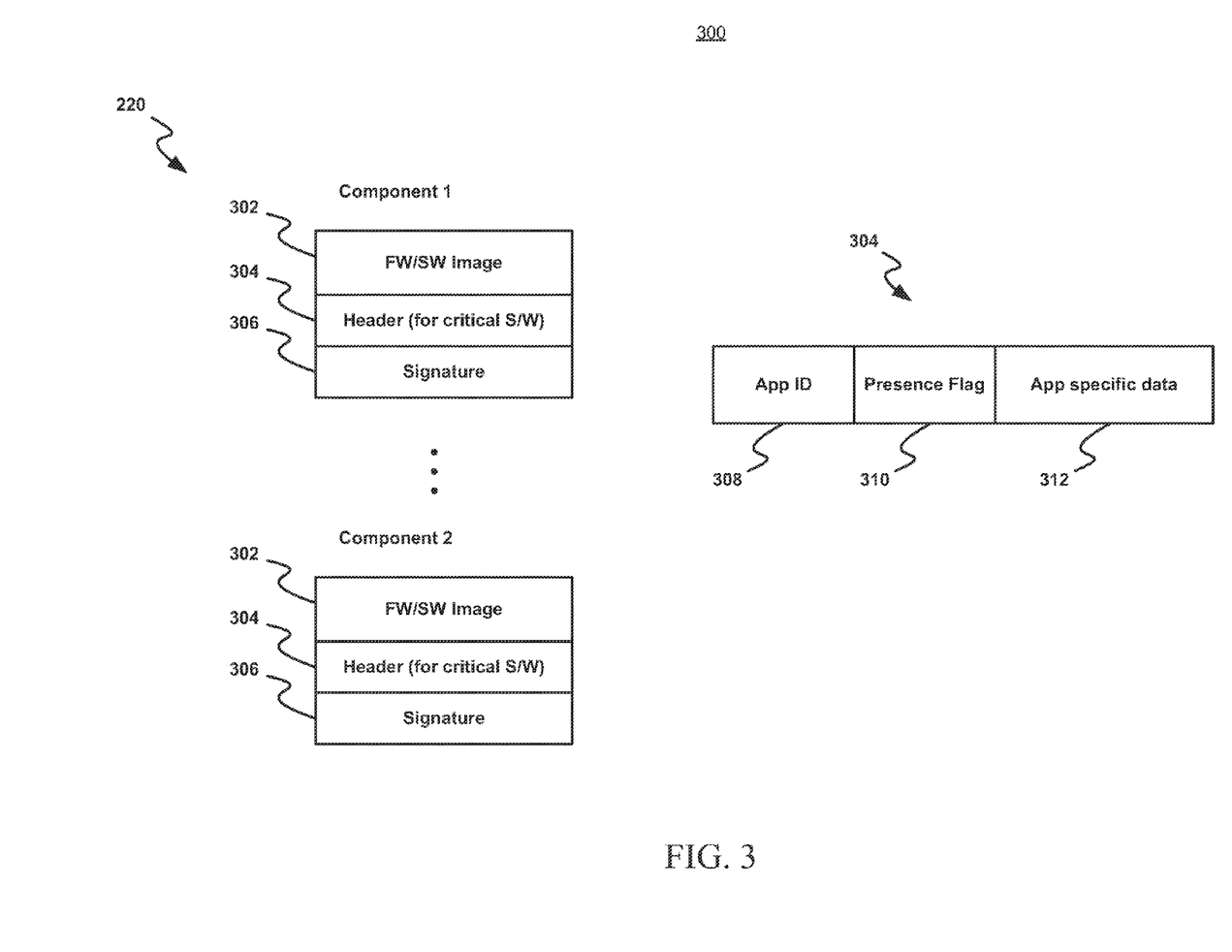
FIG. 3 illustrates a data structure consistent with an exemplary embodiment of the present disclosure.

FIG. 3 illustrates a data structure 300 consistent with an exemplary embodiment of the present disclosure. A software update image 220 is shown to include a number of software components, some or all of which may be critical components. The components comprise a FW or SW image 302 which may be a binary executable, a header 304 and a digital signature 306. The digital signature 306, which may be an encrypted signature, is used to verify the integrity of the component and that the component is provided by a trusted source. In some embodiments, the header 304 may be omitted for non-critical components. The header 304 is shown to include an application ID 308 which identifies the component, a presence flag 310 to indicate the presence or absence of that component, and, optionally, an area for application specific data 312 associated with the component. The ID 308 and presence flag 310 information in the header may be matched against information in the SCCD 218 by the secure update application module 216 to ensure that software update images include all of the critical components before allowing installation of the update.

Figure 4:
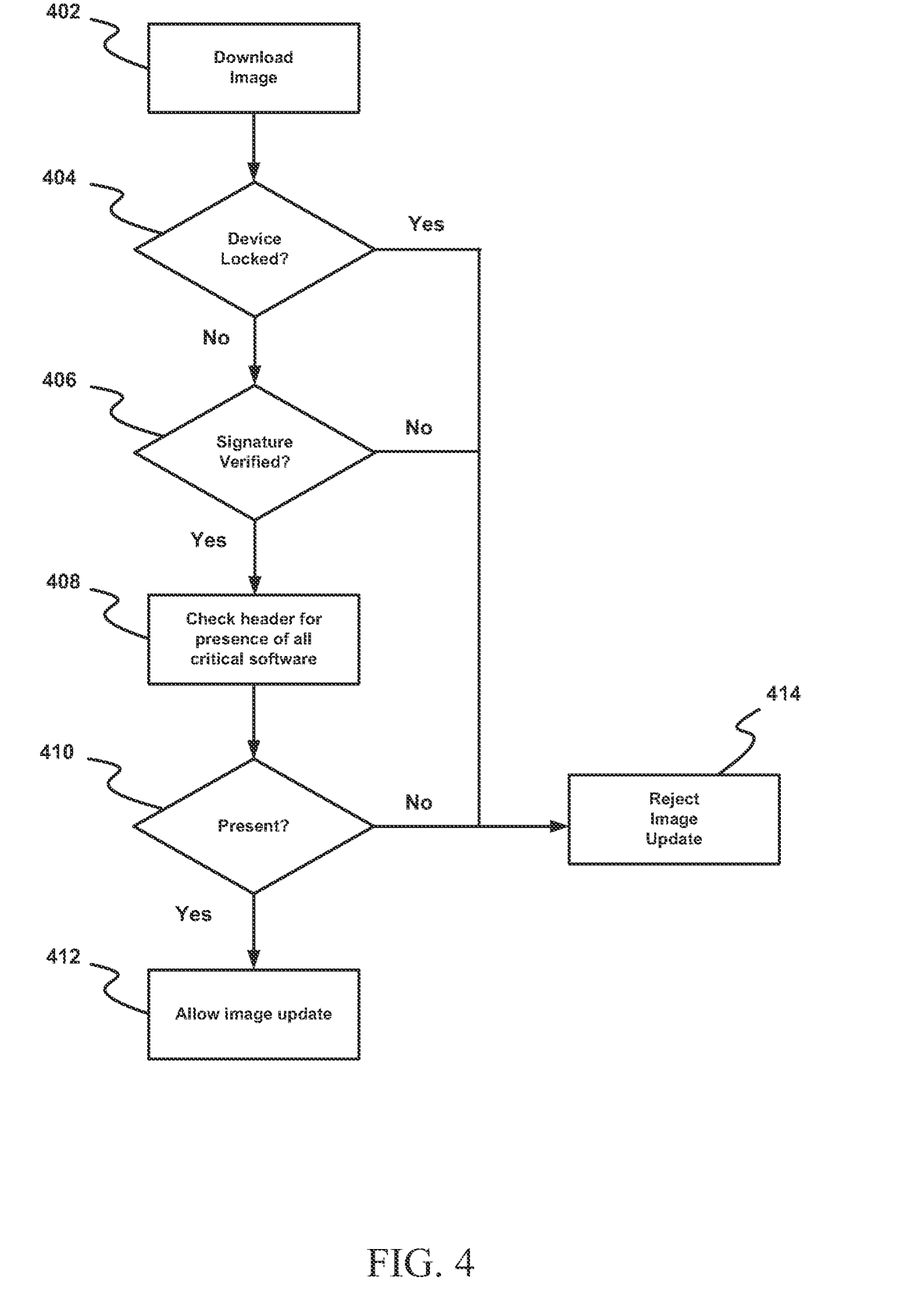
FIG. 4 illustrates a flowchart of operations of one exemplary embodiment consistent with the present disclosure.

FIG. 4 illustrates a flowchart of operations 400 of one exemplary embodiment consistent with the present disclosure. At operation 402, a software update image is downloaded. The download may be accomplished wirelessly from an update server to the mobile platform. At operation 404, a check is performed to determine if the platform or device is locked and, if so, the image update is rejected or postponed at operation 414. At operation 406, the digital signature of the software update image or components included in the image is verified. If the verification fails, the image update is rejected or postponed at operation 414. At operation 408, headers within the software update image are checked to verify the presence of all critical software components. The check may be performed as a match against a database that identifies critical components for the device. If the check fails, the image update is rejected or postponed at operation 414, otherwise the image update is allowed at operation 412.

Figure 5:
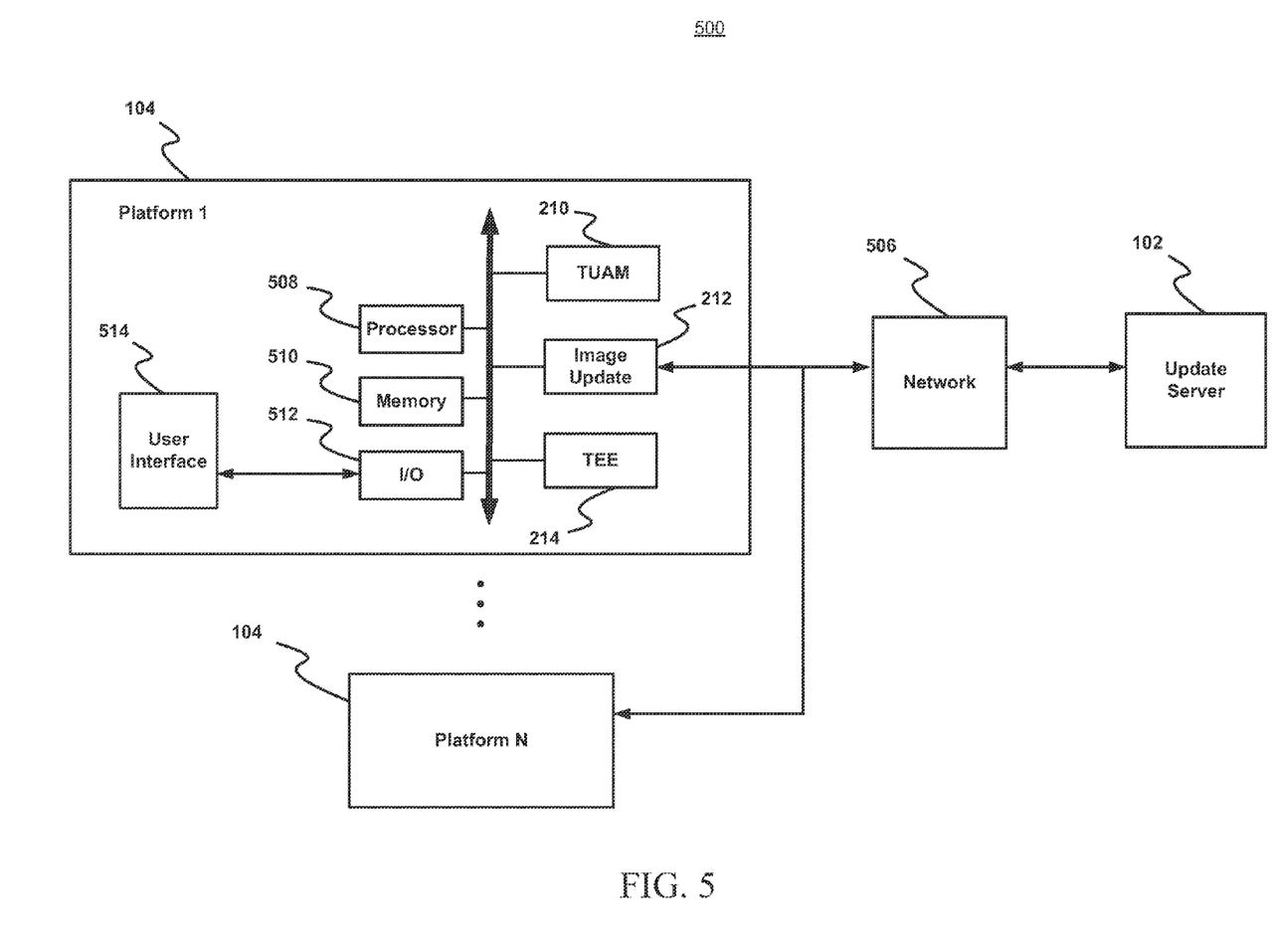
FIG. 5 illustrates a system diagram showing platforms consistent with an exemplary embodiment of the present disclosure in a network.

FIG. 5 illustrates a system diagram 500 showing platforms consistent with an exemplary embodiment of the present disclosure in a network. A platform 104 may be a mobile communication device with secure authentication and update capability, such as, for example, a smartphone, a tablet, a laptop computing device or any other device configured to transmit or receive wireless signals. In some embodiments, platform 104 may comprise a processor 508, memory 510, an input/output (I/O) system 512, a display/keyboard or other type of user interface (UI) 514 such as, for example, a touchscreen. Platform 104 may also comprise a TUAM 210, an image update module 212 and a TEE 214 as described previously. Any number of platforms 104 may transmit or receive signals over a network 506, which may be a wireless network, to an update server 102.

Figure 6:
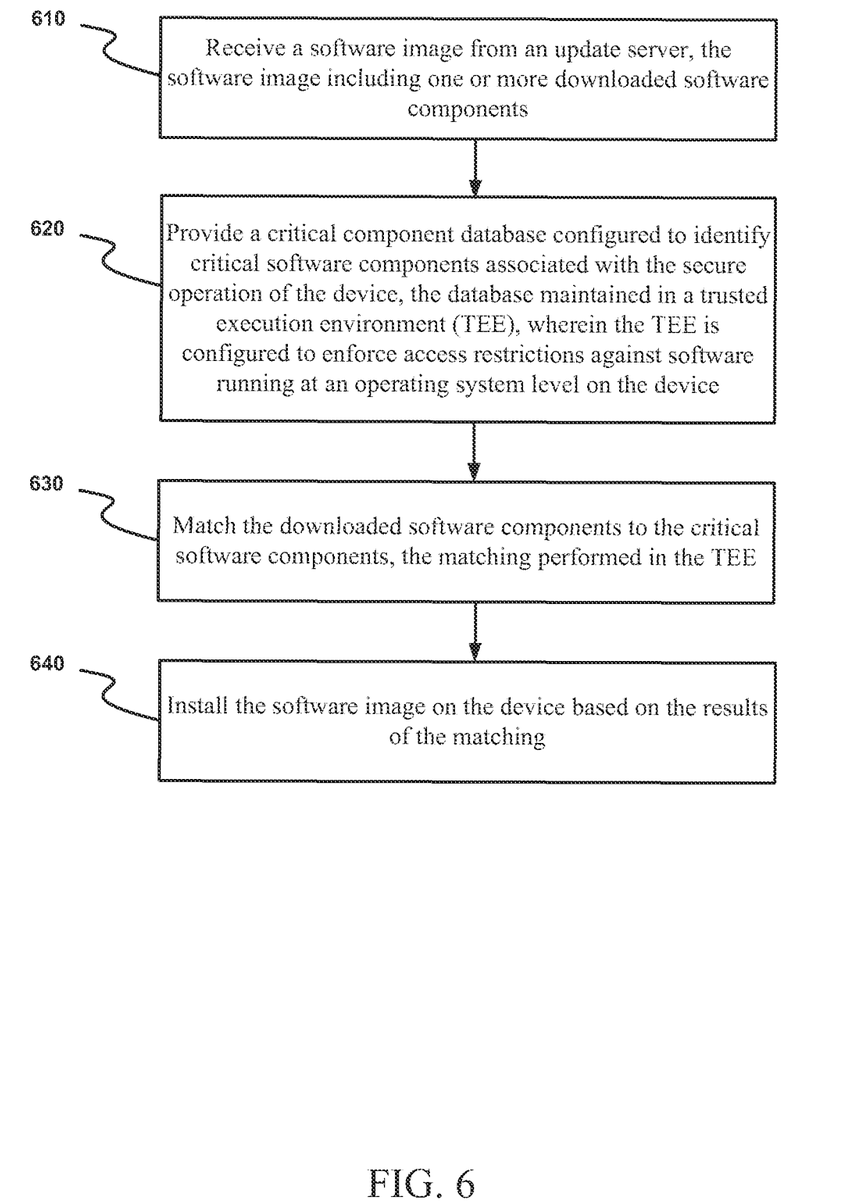
FIG. 6 illustrates a flowchart of operations of another exemplary embodiment consistent with the present disclosure.

FIG. 6 illustrates a flowchart of operations 600 of another exemplary embodiment consistent with the present disclosure. At operation 610, a software image is received from an update server. The software image includes one or more downloaded software components. At operation 620, a critical component database is provided. The database is configured to identify critical software components associated with the secure operation of the device. The database is maintained in a TEE that is configured to enforce access restrictions against software running at an operating system level on the device. At operation 630, the downloaded software components are matched to the critical software components in the database. The matching is performed in the TEE. At operation 640, the software image is installed on the device based on the results of the matching.

Embodiments of the methods described herein may be implemented in a system that includes one or more storage media having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a device, method, system and computer readable storage media for secure operating system and firmware updates for mobile platforms with trusted hardware based authentication. The following additional example embodiments may be provided.

Example 1 is a device that may include an image update module configured to receive a software update image from an update server, the image update module executing at an OS level. The device of this example may also include a critical component database configured to identify critical software components associated with the secure operation of the device. The device of this example may further include a secure update application module configured to verify the inclusion of the critical software components in the software update image prior to installation of the software update image on the device. The device of this example may further include a TEE configured to restrict control access and data access to the secure update application module and the critical component database, the restriction enforced against the OS and against modules executing at the OS level.

Example 2 includes the subject matter of example 1 and also includes the forgoing components and a TUAM configured to authenticate a user of the device based on authentication information maintained in the TEE.

Example 3 is another example device including the subject matter of either of examples 1 or 2, and also wherein the authentication information is a password and/or the authentication is performed prior to the installation of the software update image.

Example 4 is another example device including the subject matter of either of examples 1 or 2, and also wherein the image update module is further configured to report a failure of the inclusion verification to the update server and/or to report the identity of components included in the software update image in response to receiving a query.

Example 5 is another example device including the subject matter of either example 1 or 2, and also wherein the secure update application module is further configured to verify a digital signature associated with the software update image.

Example 6 is a method that may include receiving the software image from an update server, and the software image includes one or more downloaded software components. The method of this example may also include providing a critical component database configured to identify critical software components associated with the secure operation of the device, the database maintained in a TEE, and the TEE is configured to enforce access restrictions against software running at an operating system level on the device. The method of this example may further include matching the downloaded software components to the critical software components, the matching performed in the TEE. The method of this example may further include installing the software image on the device based on the results of the matching.

Example 7 includes the subject matter of example 6 and also includes the forgoing operations and further includes rejecting the software image update in response to determining that the device is in a locked state.

Example 8 is another example method including the subject matter of either of examples 6 or 7, and includes rejecting the software image update in response to a failure to verify a digital signature associated with the software image and/or rejecting the software image update in response to a failure to authenticate a user of the device based on authentication information maintained in the TEE.

Example 9 is another example method including the subject matter of any of claims 6 through 8 and further includes reporting to the update server a failure of the matching and/or reporting the identity of the downloaded software components included in the software image in response to receiving a query.

Example 10 is at least one computer-readable storage medium having instructions stored thereon which when executed by a processor, cause the processor to perform the steps of the method as described in examples 6 through 9.

Example 11 is a mobile communication platform. The platform may include a processor, a memory coupled to the processor, an I/O system coupled to the processor and a user interface coupled to the I/O system. The platform of this example may also include an image update module configured to receive a software update image from an update server, the image update module executing at an OS level. The platform of this example may further include a critical component database configured to identify critical software components associated with the secure operation of the platform. The platform of this example may further include a secure update application module configured to verify the inclusion of the critical software components in the software update image prior to installation of the software update image on the platform. The platform of this example may further include a TEE configured to restrict control access and data access to the secure update application module and the critical component database, the restriction enforced against the OS and against modules executing at the OS level.

Example 12 includes the subject matter of example 11 and also includes the forgoing components and a TUAM configured to authenticate a user of the platform based on authentication information maintained in the TEE.

Example 13 is another example platform including the subject matter of either of examples 11 or 12, and also wherein the authentication information is a password and/or the authentication is performed prior to the installation of the software update image.

Example 14 is another example platform including the subject matter of either of examples 11 or 12, and also wherein the image update module is further configured to report a failure of the inclusion verification to the update server and/or to report the identity of components included in the software update image in response to receiving a query.

Example 15 is another example platform including the subject matter of either example 11 or 12, and also wherein the secure update application module is further configured to verify a digital signature associated with the software update image.

Example 16 is another example platform including the subject matter of either example 11 or 12, and the platform is one of a smartphone, a laptop computing device or a tablet, and the user interface is a touchscreen. A plurality of platforms may be included, each configured to communicate over a wireless network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A communication device having a memory and a processor coupled to said memory, said communication device comprising:
   an image update system to receive a software update image from an update server, said image update system executing at an operating system (OS) level; and
   a trusted execution environment (TEE) operating on said device to restrict control access and data access, by an OS and applications executing on said OS level, to systems operating within said TEE, said TEE including:
      a critical component database including data identifying critical software components associated with secure operation of said device, wherein said identifying data is included in said critical component database prior to said software update image being received from said update server; and
      a secure update application system to verify, using the identifying data, the inclusion of said critical software components in said software update image prior to installation of said software update image on said device.

2. The device of claim 1, further comprising a trusted user authentication system to authenticate a user of said device based on authentication information maintained in said TEE.

3. The device of claim 2, wherein said authentication is to be performed prior to said installation of said software update image.

4. The device of claim 1, wherein said image update system is further configured to report a failure of said inclusion verification to said update server.

5. The device of claim 1, wherein said secure update application system is further configured to verify a digital signature associated with said software update image.

6. The device of claim 1, wherein said image update system is further configured to report the identity of components included in said software update image in response to receiving a query.

7. A method for securely updating a software image for a communication device, said method comprising:
   receiving said software image from an update server, wherein said software image comprises one or more downloaded software components;
   matching said downloaded software components to identifying data identifying critical software components associated with secure operations of said device included in a critical component database, wherein said critical component database is maintained in a trusted execution environment (TEE) operating on said device and said identifying data is included in said critical component database prior to said software image being received from said update server, wherein said TEE is to enforce control access and data access restrictions against software running at an operating system level on said device, said matching performed in said TEE to verify, using said identifying data, the inclusion of said critical software components in said software image prior to installation of said software image on said device; and
   installing said software image on said device based on the results of said matching.

8. The method of claim 7, further comprising rejecting said software image in response to determining that said device is in a locked state.

9. The method of claim 7, further comprising rejecting said software image in response to a failure to verify a digital signature associated with said software image.

10. The method of claim 7, further comprising rejecting said software image in response to a failure to authenticate a user of said device based on authentication information maintained in said TEE.

11. The method of claim 7, further comprising reporting to said update server a failure of said matching.

12. The method of claim 7, further comprising reporting the identity of said downloaded software components included in said software image in response to receiving a query.

13. One or more computer-readable storage memories having instructions stored thereon which when executed by a processor result in the following operations for securely updating a software image for a communication device, said operations comprising:
   causing said software image to be received from an update server, wherein said software image comprises one or more downloaded software components;
   matching said downloaded software components to identifying data identifying critical software components associated with secure operations of said device included in a critical component database, wherein said critical component database is maintained in a trusted execution environment (TEE) operating on said device and said identifying data is included in said critical component database prior to said software image being received from said update server, wherein said TEE is to enforce control access and data access restrictions against software running at an operating system level on said device, said matching performed in said TEE to verify, using said identifying data, the inclusion of said critical software components in said software image prior to installation of said software image on said device; and
   causing said software image to be installed on said device based on the results of said matching.

14. The one or more computer-readable storage memories of claim 13, wherein said operations further comprise rejecting said software image in response to determining that said device is in a locked state.

15. The one or more computer-readable storage memories of claim 13, wherein said operations further comprise rejecting said software image in response to a failure to verify a digital signature associated with said software image.

16. The one or more computer-readable storage memories of claim 13, wherein said operations further comprise rejecting said software image in response to a failure to authenticate a user of said device based on authentication information maintained in said TEE.

17. The one or more computer-readable storage memories of claim 13, wherein said operations further comprise reporting to said update server a failure of said matching.

18. The one or more computer-readable storage memories of claim 13, wherein said operations further comprise reporting the identity of said downloaded software components included in said software image in response to receiving a query.

19. A mobile communication platform comprising:
   a processor;
   a memory coupled to said processor;
   an input/output (I/O) system coupled to said processor;
   a user interface coupled to said I/O system;

an image update system to receive a software update image from an update server, said image update system executing at an operating system (OS) level; and a trusted execution environment (TEE) operating on said platform to restrict control access and data access, by an OS and applications executing on said OS level, to systems operating within said TEE, said TEE including:

a critical component database including data identifying critical software components associated with secure operation of said device, wherein said identifying data is included in said critical component database prior to said software update image being received from said update server; and a secure update application system to verify, using the identifying data, the inclusion of said critical software components in said software update image prior to installation of said software update image on said device.

20. The mobile communication platform of claim 19, further comprising a trusted user authentication system to authenticate a user of said platform based on authentication information maintained in said TEE.

21. The mobile communication platform of claim 20, wherein said trusted user authentication system is further configured to perform authentication prior to said installation of said software update image.

22. The mobile communication platform of claim 19, wherein said image update system is further configured to report a failure of said inclusion verification to said update server.

23. The mobile communication platform of claim 19, wherein said secure update application system is further configured to verify a digital signature associated with said software update image.

24. The mobile communication platform of claim 19, wherein said image update system is further configured to report the identity of components included in said software update image in response to receiving a query.

25. The mobile communication platform of claim 19, wherein said platform is selected from the group consisting of a smartphone, a laptop computing device and a tablet.

26. The device of claim 1, wherein at least one of the critical software components comprises a header, which includes an application ID that identifies the component and a presence flag that indicates the presence of that component.

27. The method of claim 7, wherein at least one of the critical software components comprises a header, which includes an application ID that identifies the component and a presence flag that indicates the presence of that component.

28. The computer-readable storage medium of claim 13, wherein at least one of the critical software components comprises a header, which includes an application ID that identifies the component and a presence flag that indicates the presence of that component.

29. The mobile communication platform of claim 19, wherein at least one of the critical software components comprises a header, which includes an application ID that identifies the component and a presence flag that indicates the presence of that component.

* * * * *